US011689533B2

(12) United States Patent
Lemieux et al.

(10) Patent No.: US 11,689,533 B2
(45) Date of Patent: Jun. 27, 2023

(54) MANAGING WORKSHEET ACCESS (71) Applicant: SIGMA COMPUTING, INC., San Francisco, CA (US)

(72) Inventors: Julie L. Lemieux, San Francisco, CA (US); Jason D. Frantz, San Francisco, CA (US); James L. Gale, San Francisco, CA (US); Donald Huang, San Francisco, CA (US)

(73) Assignee: SIGMA COMPUTING, INC., San Francisco, CA (US)

( * ) Notice: Subject to any disclaimer, the term of this patent is extended or adjusted under 35 U.S.C. 154(b) by 136 days.

(21) Appl. No.: 16/933,072

(22) Filed: Jul. 20, 2020

(65) Prior Publication Data
US 2021/0112066 A1 Apr. 15, 2021

Related U.S. Application Data (60) Provisional application No. 62/913,273, filed on Oct. 10, 2019.

(51) Int. Cl.
*H04L 29/06* (2006.01)
*H04L 9/40* (2022.01)

(52) U.S. Cl.
CPC .......... *H04L 63/102* (2013.01); *H04L 63/08* (2013.01)

(58) Field of Classification Search
CPC ...................... H04L 63/102; H04L 63/08
See application file for complete search history.

(56) References Cited

U.S. PATENT DOCUMENTS

| 7,712,023 B1 * | 5/2010 | Bryan | G06F 40/174 |
| | | | 705/31 |
| 10,009,391 B1 * | 6/2018 | Smith | G06F 16/2477 |
| 2006/0004844 A1 * | 1/2006 | Rothschiller | G06F 40/143 |
| | | | 707/999.102 |
| 2006/0268758 A1 * | 11/2006 | Serani | H04L 63/08 |
| | | | 370/320 |
| 2013/0318589 A1 * | 11/2013 | Ford | H04L 65/403 |
| | | | 726/7 |

(Continued)

FOREIGN PATENT DOCUMENTS

| EP | 2002359 A1 | 12/2008 |
| WO | 2007115149 A1 | 10/2007 |
| WO | 2015164521 A1 | 10/2015 |

OTHER PUBLICATIONS

International Search Report and Written Opinion, PCT/US2020/054897, dated Jan. 22, 2021, 11 pages.

*Primary Examiner* — Tongoc Tran (57) ABSTRACT

Managing worksheet access including receiving a request from a first user account to access a worksheet shared from a second user account, wherein the worksheet comprises a worksheet architecture for at least one data set from a database; determining that the first user account is authorized to access the worksheet architecture of the worksheet; determining that the first user account is authorized to access the at least one data set presented by the worksheet; and granting the first user account access to the worksheet in response to determining that the first user account is authorized to access the worksheet architecture of the worksheet and determining that the first user account is authorized to access the at least one data set presented by the worksheet.

20 Claims, 6 Drawing Sheets

(56) References Cited

U.S. PATENT DOCUMENTS

| | | | |
|---|---|---|---|
| 2014/0189483 A1* | 7/2014 | Awan | H04L 63/08 |
| | | | 715/212 |
| 2014/0245015 A1* | 8/2014 | Velamoor | H04L 63/10 |
| | | | 713/171 |
| 2014/0304836 A1 | 10/2014 | Velamoor et al. | |
| 2016/0019281 A1 | 1/2016 | Hariharan et al. | |
| 2018/0121667 A1 | 5/2018 | Karpel et al. | |

\* cited by examiner

MANAGING WORKSHEET ACCESS

CROSS-REFERENCE TO RELATED APPLICATION

This application is a non-provisional application for patent entitled to a filing date and claiming the benefit of earlier-filed U.S. Provisional Patent Application Ser. No. 62/913,273, filed Oct. 10, 2019.

BACKGROUND

Field of the Invention

The field of the invention is data processing, or, more specifically, methods, apparatus, and products for managing worksheet access.

Description Of Related Art

Modern businesses may store large amounts of data in remote databases within cloud-based data warehouses. This data may be accessed using database query languages, such as structured query language (SQL). However, different individual user accounts within an organization may have differing levels of access to the data sources within the cloud-based data warehouse.

SUMMARY

Methods, systems, and apparatus for managing worksheet access. Managing worksheet access includes receiving a request from a first user account to access a worksheet shared from a second user account, wherein the worksheet comprises a worksheet architecture for at least one data set from a database; determining that the first user account is authorized to access the worksheet architecture of the worksheet; determining that the first user account is authorized to access the at least one data set presented by the worksheet; and granting the first user account access to the worksheet in response to determining that the first user account is authorized to access the worksheet architecture of the worksheet and determining that the first user account is authorized to access the at least one data set presented by the worksheet.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
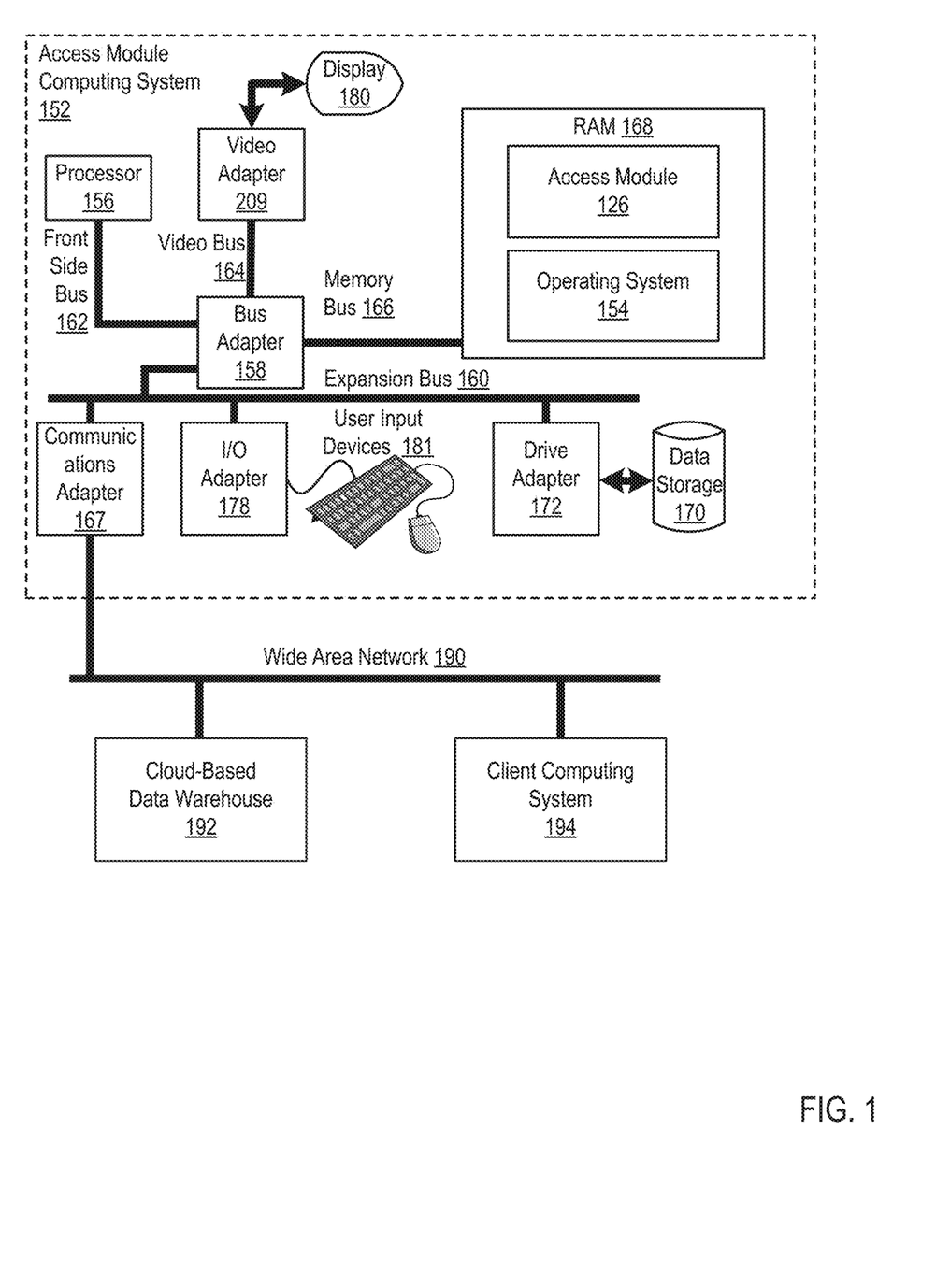
FIG. 1 sets forth a block diagram of an example system configured for managing worksheet access according to embodiments of the present invention.

Exemplary methods, apparatus, and products for managing worksheet access in accordance with the present invention are described with reference to the accompanying drawings, beginning with FIG. 1. FIG. 1 sets forth a block diagram of automated computing machinery comprising an exemplary access module computing system (152) configured for managing worksheet access according to embodiments of the present invention. The access module computing system (152) of FIG. 1 includes at least one computer processor (156) or 'CPU' as well as random access memory (168) ('RAM') which is connected through a high speed memory bus (166) and bus adapter (158) to processor (156) and to other components of the access module computing system (152).

Stored in RAM (168) is an operating system (154). Operating systems useful in computers configured for managing worksheet access according to embodiments of the present invention include UNIX™, Linux™, Microsoft Windows™, AIX™, IBM's iOS™, and others as will occur to those of skill in the art. The operating system (154) in the example of FIG. 1 is shown in RAM (168), but many components of such software typically are stored in non-volatile memory also, such as, for example, on data storage (170), such as a disk drive. Also stored in RAM is the access module (126), a module for managing worksheet access according to embodiments of the present invention.

The access module computing system (152) of FIG. 1 includes disk drive adapter (172) coupled through expansion bus (160) and bus adapter (158) to processor (156) and other components of the access module computing system (152). Disk drive adapter (172) connects non-volatile data storage to the access module computing system (152) in the form of data storage (170). Disk drive adapters useful in computers configured for managing worksheet access according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example access module computing system (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example access module computing system (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary access module computing system (152) of FIG. 1 includes a communications adapter (167) for data communications with other computers and for data communications with a data communications network. Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for managing worksheet access according to embodiments of the present invention include modems for wired dial-up communications, Ethernet (IEEE 802.3) adapters for wired data communications, and 802.11 adapters for wireless data communications.

The communications adapter (167) is communicatively coupled to a wide area network (190) that also includes a cloud-based data warehouse (192) and a client system (194). The cloud-based data warehouse (192) is a computing system or group of computing systems that hosts a database for access over the wide area network (190). The client system (194) is a computing system that accesses the database using the access module (126) on the access module computing system (152).

Figure 2:
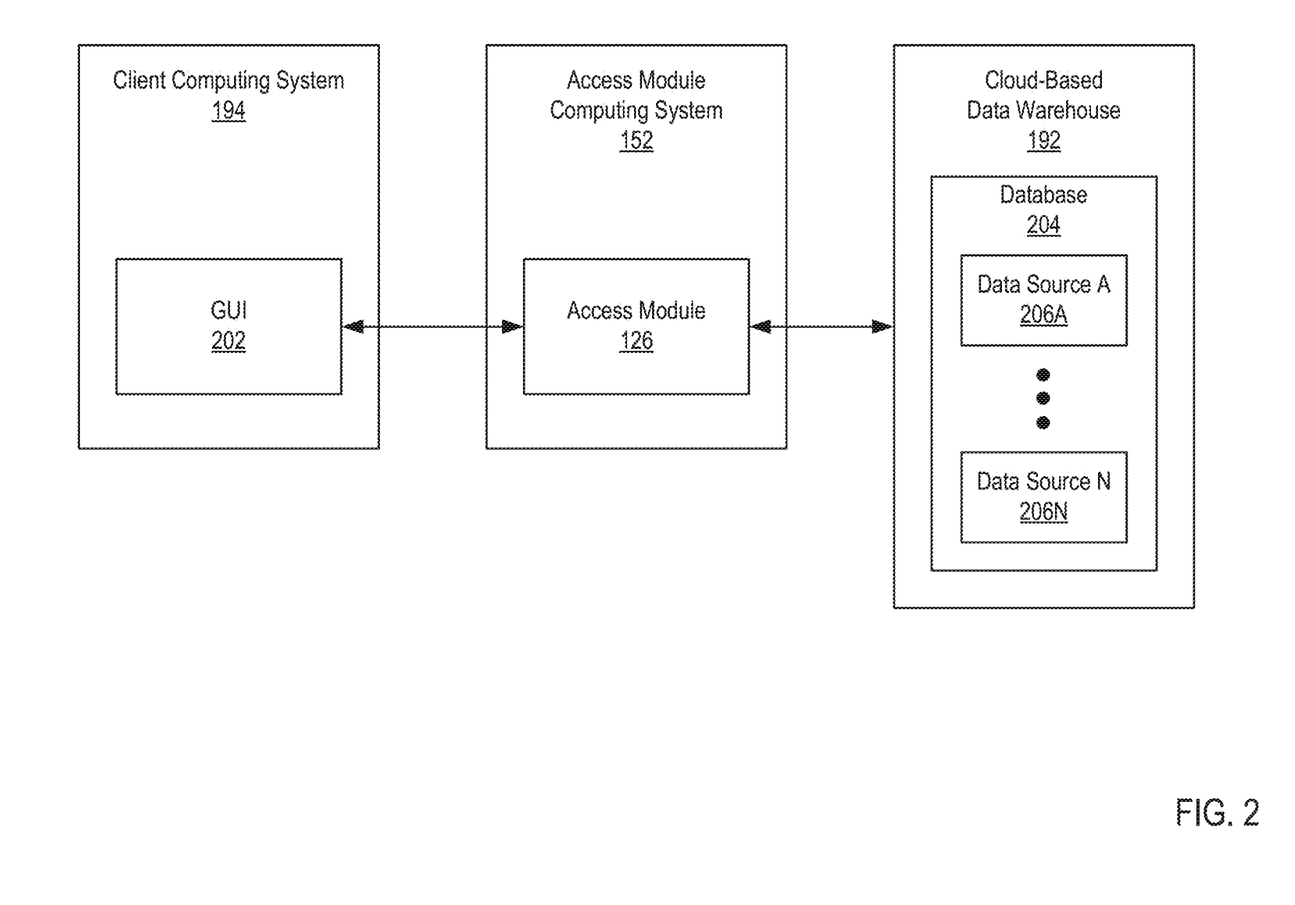
FIG. 2 sets forth a block diagram of an example system configured for managing worksheet access according to embodiments of the present invention.

FIG. 2 shows an exemplary system for managing worksheet access according to embodiments of the present invention. As shown in FIG. 2, the exemplary system includes a client computing system (194), an access module computing system (152), and a cloud-based data warehouse (192). The client computing system (194) includes a graphical user interface (GUI). The access module computing system (152) includes an access module (126). The cloud-based data warehouse (192) includes a database (204). The database (204) includes a number of data sources (data source A (206A), data source N (206N).

The GUI (202) is a visual presentation configured to present worksheets that include worksheet architectures and data sets from the data sources (data source A (206A), data source N (206N)). The GUI (202) also receives requests from a user (via a user account) for data sets from the database (206). The GUI (202) may be presented, in part, by the access module (126) and displayed on a client computing system (194) (e.g., on a system display or mobile touchscreen). The GUI (202) may be part of an Internet application that includes the access module (126) and is hosted on the access module computing system (152).

The database (204) is a collection of data sources (data source A (206A), data source N (206N)) and a management system for the data. A data source (data source A (206A), data source N (206N)) is a collection of related data on the database (204). Examples of data sources include tables, schemas, and folders. A data set is a collection of data from a data source (data source A (206A), data source N (206N)) on the database (204). Data sets may be generated in response to a database query and provided to the access module (126). Data sets may be organized into columns and rows. The particular columns, rows, and organization of the columns and rows that make up a data set may be specified in the database query requesting the data set.

The access module (126) is hardware, software, or an aggregation of hardware and software configured to receive requests from the client computing system (194), via the GUI (GUI). The access module (126) is also configured to generate database queries in response to requests for data sets and manipulations of those data sets. The access module (126) may be part of a database query generator that generates the database query.

The access module (126) presents, via the GUI (202), a worksheet using the information in the worksheet metadata. Worksheet metadata is data that describes a worksheet. Specifically, the worksheet metadata may include a description of the data set and a worksheet architecture. The description of the data set describes which data is to be requested via the database query. The description of the data set may include which columns and rows of data from the data source are to be retrieved from the database (206) via the database query. The data set presented in the worksheet may be referred to as the underlying data set (i.e., the data set upon which the worksheet is created).

The worksheet architecture includes the functions to be applied to the data set and the presentation structure of the data set. The functions to be applied to the data set may include the manipulations of the data in the columns and rows received in the data set. Such manipulations may include calculation columns that apply a function to data in the data set. The presentation structure of the data set may include presentation selections made by a user. The presentation structure may include the hierarchical relationship between the columns, filters applied to the data, and the manner in which the data is sorted. The presentation structure of the data set may also include the GUI visibility of particular data within the data set. GUI visibility may be altered based on filter settings of the data or on the visibility status (e.g., hidden or not hidden) of a column within the data set. The presentation structure of the data set may also include the formatting of the worksheet, such as the size of rows and columns.

Worksheet metadata may also include a reference to, or identifier of, the worksheet metadata for a different worksheet. For example, the worksheet metadata for a referencing worksheet may include a reference to the data source worksheet from which the referencing worksheet was linked. Further, referencing worksheet metadata may lack a reference to the database or data set upon which the data source worksheet was built. Rather, the referencing worksheet metadata may only include a reference to the data source worksheet metadata, and that reference is used to retrieve the data source worksheet metadata. Because the referencing worksheet metadata may lack a reference to the database or data set, both the referencing worksheet metadata and data source worksheet metadata are used to generate the database query.

The access module (126) also manages access authorization for worksheets and the underlying data sets using user accounts. Each user account may have access to zero or more data sources (data source A (206A), data source N (206N)) on the cloud-based data warehouse (192). In addition, for each data source accessible by a user account, a grant option may also exist for that user account and data source. A grant option is the ability to grant other user accounts access to that data source (or a portion of that data source). This granted access may be limited in a variety of ways. For example, access granted using a grant option may be limited to a specific worksheet presenting a data set from the data source associated with the grant option. Consequently, a user account may have one of three types of access to each data source—no access to the data source, direct access to the data source, or granted access to the data source.

As a specific example, assume that a manager has direct access to a financial table on a database and also has a grant option for the same financial table. Assume further that the manager creates a budget worksheet that presents a data set from the financial table and wants to share the budget worksheet with an accountant at the organization. The accountant has no access to the financial table. However, the manager is able to share the budget worksheet with the accountant because the manager has a grant option for the data source (i.e., the financial table). The accountant's access to the financial table may be limited to the data set from the financial table viewable in the budget worksheet.

Figure 3:
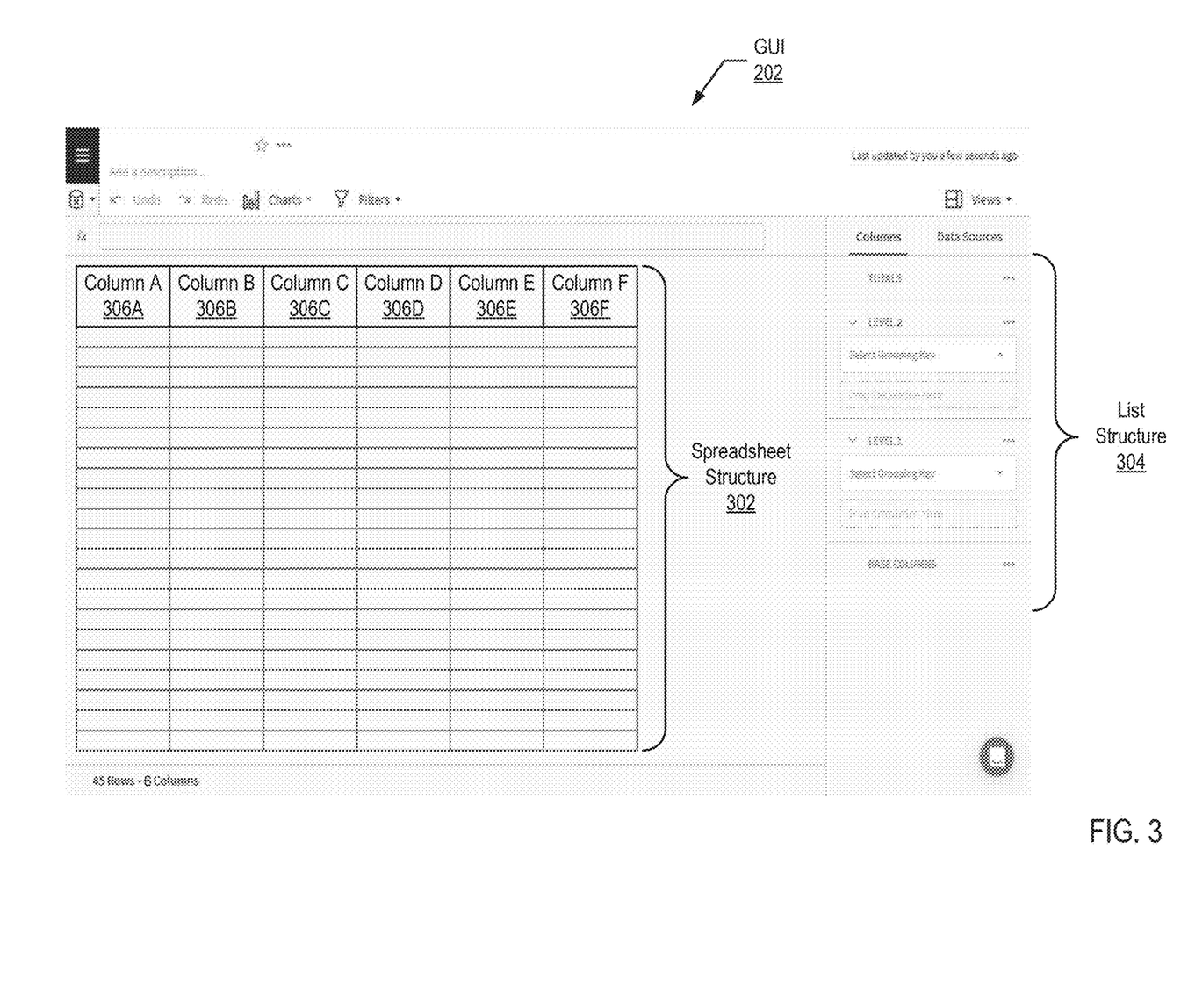
FIG. 3 sets forth a block diagram of an example system configured for managing worksheet access according to embodiments of the present invention.

FIG. 3 shows an exemplary system for managing worksheet access according to embodiments of the present invention. As shown in FIG. 3, the exemplary GUI (202) includes a spreadsheet structure (302), a list structure (304), and an exposable parameter (306). The spreadsheet structure (302) includes a worksheet (shown as empty rows) with six columns (column A (306A), column B (306B), column C (306C), column D (306D), column E (306E), column F (306F)).

The spreadsheet structure (302) is a graphical element and organizing mechanism for a worksheet that presents a data set. A worksheet is a presentation of a data set from a database (204). The spreadsheet structure (302) displays the worksheet as rows of data organized by columns (column A (306A), column B (306B), column C (306C), column D (306D), column E (306E), column F (306F)). The columns delineate different categories of the data in each row of the worksheet. The columns may also be calculation columns that include calculation results using other columns in the worksheet.

The list structure (304) is a graphical element used to define and organize the hierarchical relationships between the columns (column A (306A), column B (306B), column C (306C), column D (306D), column E (306E), column F (306F)) of the data set. The term "hierarchical relationship" refers to subordinate and superior groupings of columns. For example, a database may include rows for an address book, and columns for state, county, city, and street. A data set from the database may be grouped first by state, then by county, and then by city. Accordingly, the state column would be at the highest level in the hierarchical relationship, the county column would be in the second level in the hierarchical relationship, and the city column would be at the lowest level in the hierarchical relationship.

The list structure (304) presents a dimensional hierarchy to the user. Specifically, the list structure (304) presents levels arranged hierarchically across at least one dimension. Each level within the list structure (304) is a position within a hierarchical relationship between columns (column A (306A), column B (306B), column C (306C), column D (306D), column E (306E), column F (306F)). The keys within the list structure (304) identify the one or more columns that are the participants in the hierarchical relationship. Each level may have more than one key.

One of the levels in the list structure (304) may be a base level. Columns selected for the base level provide data at the finest granularity. One of the levels in the list structure (304) may be a totals or root level. Columns selected for the totals level provide data at the highest granular level. For example, the totals level may include a field that calculates the sum of each row within a single column of the entire data set (i.e., not partitioned by any other column).

The GUI (202) may enable a user to drag and drop columns (column A (306A), column B (306B), column C (306C), column D (306D), column E (306E), column F (306F)) into the list structure (304). The order of the list structure (304) may specify the hierarchy of the columns relative to one another. A user may be able to drag and drop the columns in the list structure (304) at any time to redefine the hierarchical relationship between columns. The hierarchical relationship defined using the columns selected as keys in the list structure (304) may be utilized in charts such that drilling down (e.g., double click on a bar), enables a new chart to be generated based on a level lower in the hierarchy.

The GUI (202) may also include a mechanism for a user to request a data set from a database to be presented as a worksheet in the GUI (202). Such a mechanism may be part of the interactivity of the worksheet. Specifically, a user may manipulate a worksheet (e.g., by dragging and dropping columns or rows, resorting columns or rows, etc.) and, in response, the GUI (202) may generate request (e.g., in the form of a state specification) for a data set and send the request to the data analyzer (126). Such a mechanism may also include a direct identification of the rows and columns of a database data set that a user would like to access (e.g., via a selection of the rows and columns in a dialog box).

Figure 4:
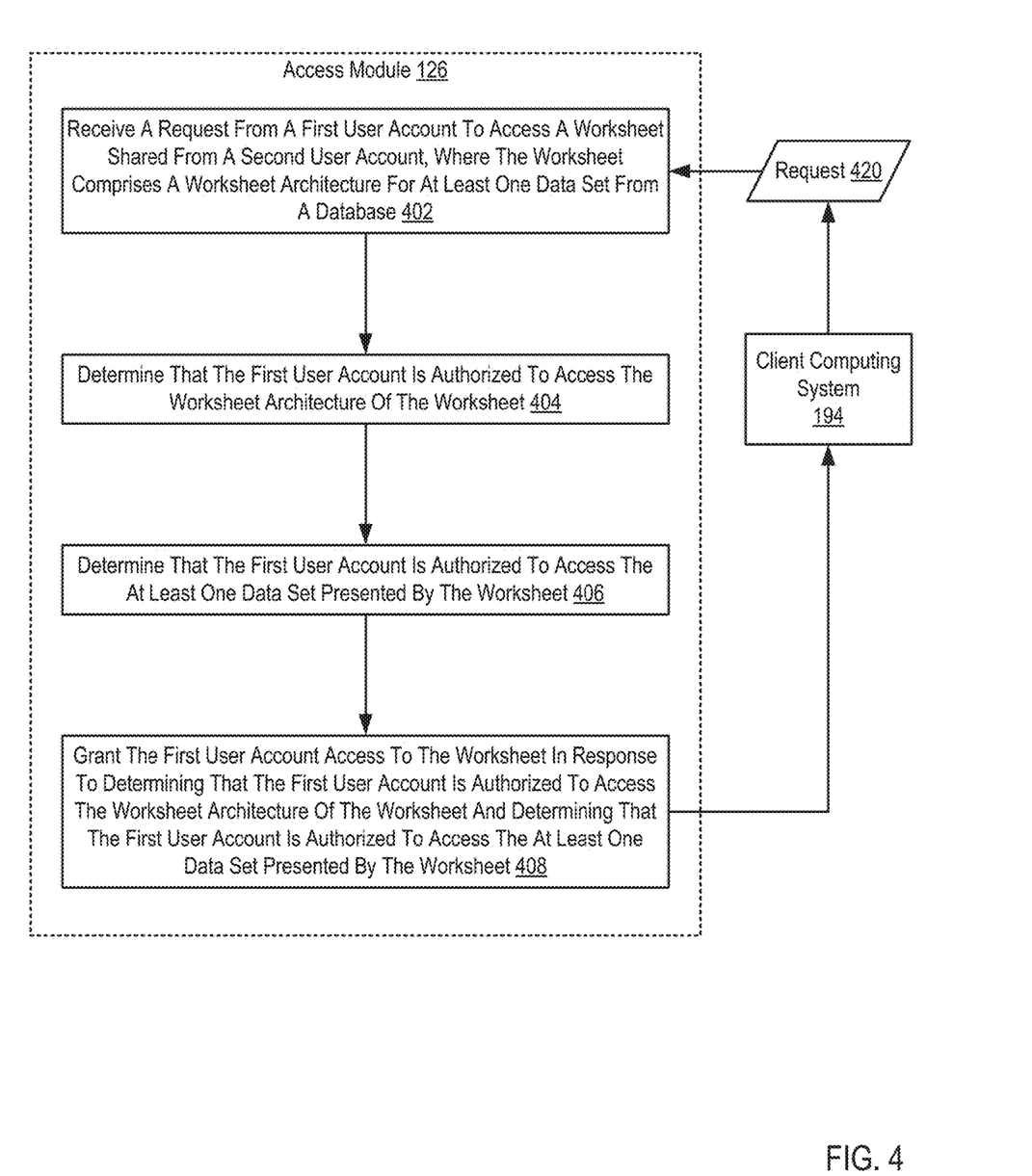
FIG. 4 sets forth a flow chart illustrating an exemplary method for managing worksheet access according to embodiments of the present invention.

For further explanation, FIG. 4 sets forth a flow chart illustrating an exemplary method for managing worksheet access according to embodiments of the present invention that includes receiving (402) a request (420) from a first user account to access a worksheet shared from a second user account, wherein the worksheet comprises a worksheet architecture for at least one data set from a database. Receiving (402) a request (420) from a first user account to access a worksheet shared from a second user account, wherein the worksheet comprises a worksheet architecture for at least one data set from a database may be carried out by the access module (126) receiving an initial request from the second user account, as an owner of the worksheet, to share the worksheet with the first user account.

A worksheet owner is a user account that has a high level set of authorizations for a worksheet (as compared to a viewer). A worksheet owner may share the worksheet with other user accounts. A worksheet owner may also designate the worksheet recipient as an owner of the worksheet or a viewer of the worksheet. A worksheet viewer may view the worksheet (assuming the worksheet viewer has access to the underlying data set) but may not share the worksheet with another user account.

The method of FIG. 4 further includes determining (404) that the first user account is authorized to access the worksheet architecture of the worksheet. In order to access a worksheet, a user account must have access to both the worksheet architecture and the underlying data set. The second user account (that is an owner of the worksheet) may grant the first user account access to the worksheet architecture by sharing the worksheet with the first user account. Specifically, by sharing the worksheet, the second user account is implicitly granting the first user account access to at least the worksheet architecture.

Determining (404) that the first user account is authorized to access the worksheet architecture of the worksheet may be carried out by the access module (126) determining that the second user account is an owner of the worksheet. As an owner of the worksheet, the second user account may attempt to share the worksheet with the first user, assuming the first user has access to the underlying data set. The access module (126) may determine whether the second user account has ownership of the worksheet at the time the second user account attempts to share the worksheet with the first user account (as opposed to when the first user account attempts to access the worksheet).

The method of FIG. 4 further includes determining (406) that the first user account is authorized to access the at least one data set presented by the worksheet. Determining (406) that the first user account is authorized to access the at least one data set presented by the worksheet may be carried out by the access module (126) determining if the first user account has direct access to the data source of the underlying data set and, if not, determining whether the second user account is authorized to grant access to the underlying data set.

The access module (126) may determine whether the first user account is authorized to access each underlying data set for the worksheet. Each worksheet may have one or more underlying data sets presented in the worksheet. The access module (126) may determine whether the first user account is authorized to access each data set by determining whether the first user account is authorized to access each data source of each data set. For example, if the worksheet includes a first data set from a first data source and a second data set from a second data source, the access module may first determine whether the first user account is authorized to access the first data source, and then determine whether the first user account is authorized to access the second data source. Access to the worksheet may be restricted to users authorized to access every data set presented in the worksheet.

The method of FIG. 4 further includes granting (408) the first user account access to the worksheet in response to determining that the first user account is authorized to access the worksheet architecture of the worksheet and determining that the first user account is authorized to access the at least one data set presented by the worksheet. Granting (408) the first user account access to the worksheet in response to determining that the first user account is authorized to access the worksheet architecture of the worksheet and determining that the first user account is authorized to access the at least one data set presented by the worksheet may be carried out by the access module (126) presenting, to a user of the first user account, the at least one data set from the database within the worksheet comprising the worksheet architecture for the at least one data set from the database. The worksheet may be presented in the GUI on the client computer system from which the first user account is communicating.

The first user account may be denied access to the worksheet in response to determining that the first user account is authorized to access the worksheet architecture of the worksheet but that the first user account is not authorized to access the at least one data set presented by the worksheet. In response, the access module (126) may present the first user account with an error or, alternatively, present the first user account with the worksheet architecture with empty cells.

The above limitations improve the operation of the computer system by verifying that a user account is authorized to access both the worksheet architecture as well as the underlying data set before granting access to the worksheet. By verifying both authorizations, security for the worksheets and underlying data is improved.

Figure 5:
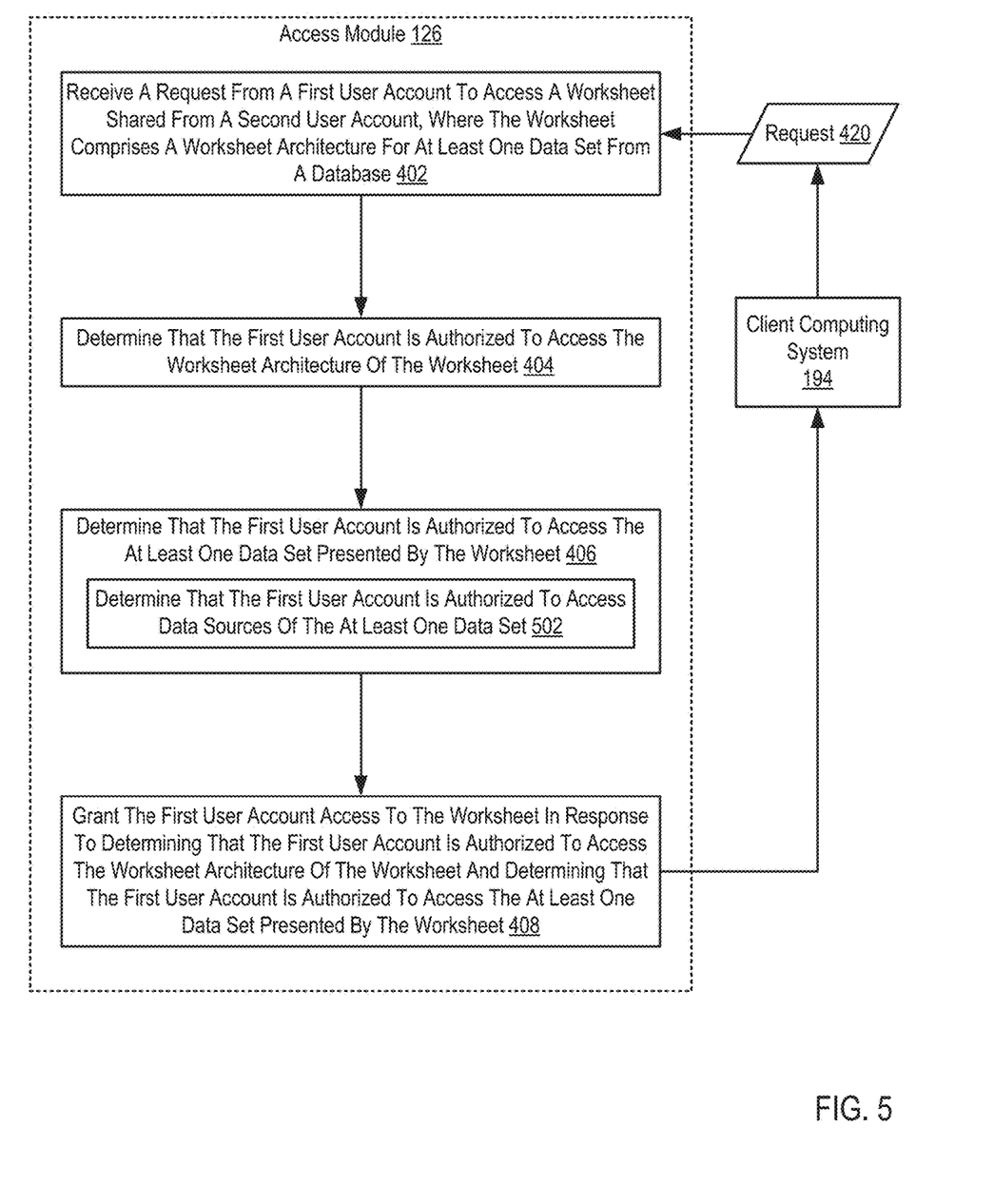
FIG. 5 sets forth a flow chart illustrating an exemplary method for managing worksheet access according to embodiments of the present invention.

For further explanation, FIG. 5 sets forth a flow chart illustrating a further exemplary method for managing worksheet access according to embodiments of the present invention that includes receiving (402) a request (420) from a first user account to access a worksheet shared from a second user account, wherein the worksheet comprises a worksheet architecture for at least one data set from a database; determining (404) that the first user account is authorized to access the worksheet architecture of the worksheet; determining (406) that the first user account is authorized to access the at least one data set presented by the worksheet; and granting (408) the first user account access to the worksheet in response to determining that the first user account is authorized to access the worksheet architecture of the worksheet and determining that the first user account is authorized to access the at least one data set presented by the worksheet.

The method of FIG. 5 differs from the method of FIG. 4, however, in determining (406) that the first user account is authorized to access the at least one data set presented by the worksheet includes determining (502) that the first user account is authorized to access data sources of the at least one data set. Determining (502) that the first user account is authorized to access data sources of the at least one data set may be carried out by the access module (126) retrieving a list of authorized user accounts for each data source of each data set. The access module (126) may then compare an identifier of the first user account to the identifiers of the authorized user accounts in the list. The list may include each user account with inherited authorization, such as a user account that is authorized to access a folder that contains the data source.

Figure 6:
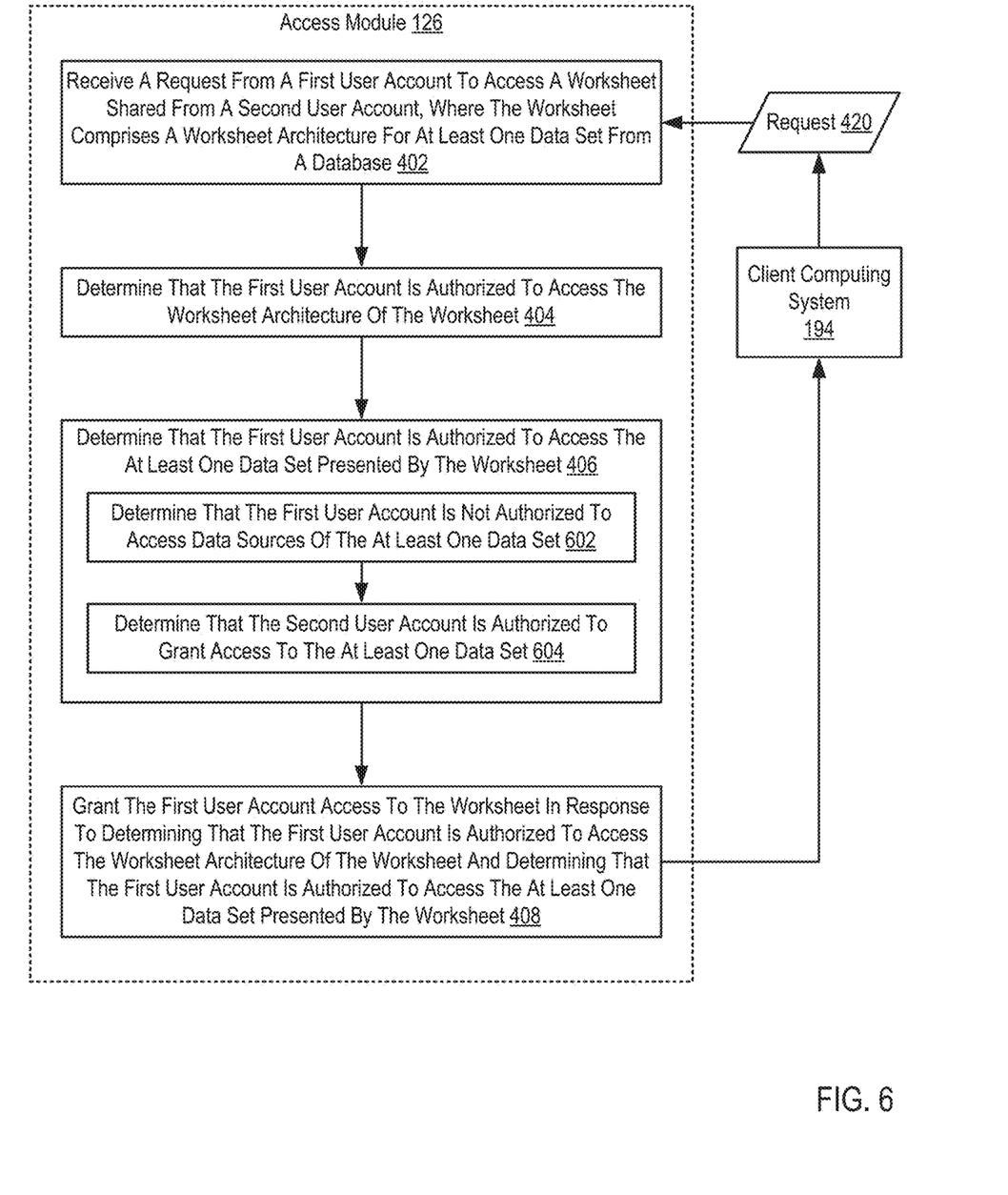
FIG. 6 sets forth a flow chart illustrating an exemplary method for managing worksheet access according to embodiments of the present invention.

For further explanation, FIG. 6 sets forth a flow chart illustrating a further exemplary method for managing worksheet access according to embodiments of the present invention that includes receiving (402) a request (420) from a first user account to access a worksheet shared from a second user account, wherein the worksheet comprises a worksheet architecture for at least one data set from a database; determining (404) that the first user account is authorized to access the worksheet architecture of the worksheet; determining (406) that the first user account is authorized to access the at least one data set presented by the worksheet; and granting (408) the first user account access to the worksheet in response to determining that the first user account is authorized to access the worksheet architecture of the worksheet and determining that the first user account is authorized to access the at least one data set presented by the worksheet.

The method of FIG. 6 differs from the method of FIG. 4, however, in determining (406) that the first user account is authorized to access the at least one data set presented by the worksheet includes determining (602) that the first user account is not authorized to access data sources of the at least one data set; and determining (604) that the second user account is authorized to grant access to the at least one data set.

Determining (602) that the first user account is not authorized to access data sources of the at least one data set may be carried out by the access module (126) retrieving a list of authorized user accounts for each data source of each data set. The access module (126) may then compare an identifier of the first user account to the identifiers of the authorized user accounts in the list and determine that the first user account is not among the list.

Determining (604) that the second user account is authorized to grant access to the at least one data set may be carried out by the access module (126) determining whether the user account that shared the worksheet has a grant option to grant other user accounts access to that data source (or a portion of that data source). If the second user account does have a grant option with regard to the data source of the data set, then the first user account is granted access to the worksheet. If the second user account does not have a grant option with regard to the data source of the data set, then the first user account is denied access to the worksheet.

If a user account is granted access to the underlying data set of a worksheet through a grant option, then the access module (126) may limit that user account's access to only the data set without granting access to the entire data source. Specifically, the access module (126) may determine that the first user account is not authorized to access portions of the data source of the data set that are not within the data set presented in the worksheet.

The above steps may be performed for each data set presented in the worksheet. Further the first user account may have a different type of authorization for different data sets and data sources. For example, a worksheet may present two data sets from two separate data sources. The access module (126) may first determine that the first user account has direct authorization (i.e., not via grant option) to access to the first data source, and is therefore authorized to access the first data set. The access module (126) may then determine that the first user account does not have direct authorization to access the second data source for the second data set. The access module (126) subsequently determines whether the second user account that shared the worksheet has a grant option. If the second user account has a grant option with regard to the second data source, then the first user account is granted access to the worksheet based on both the granted access by the second user account for the second data source and the direct authorization to access the first data source.

In view of the explanations set forth above, readers will recognize that the benefits of managing worksheet access according to embodiments of the present invention include:
  Improving the operation of a computing system by verifying that a user account is authorized to access both the worksheet architecture as well as the underlying data set before granting access to the worksheet increasing computing system security and data integrity.
  Improving the operation of a computing system by protecting worksheets separately from the underlying data sources, increasing computing system functionality.

Exemplary embodiments of the present invention are described largely in the context of a fully functional computer system for managing worksheet access. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of managing worksheet access, the method comprising:
    receiving a request from a first user account to access a worksheet shared from a second user account, wherein the worksheet comprises a worksheet architecture for at least one data set from a database;
    determining that the first user account is authorized to access the worksheet architecture of the worksheet;
    determining that the first user account is authorized to access the at least one data set presented by the worksheet, including comparing an identifier of the first user account to identifiers of an authorized set of user accounts for each data source within the database and associated with the at least one data set; and
    granting the first user account access to the worksheet in response to determining that the first user account is authorized to access the worksheet architecture of the worksheet and determining that the first user account is authorized to access the at least one data set presented by the worksheet.

2. The method of claim 1, wherein determining that the first user account is authorized to access the at least one data set presented by the worksheet comprises determining that the first user account is authorized to access data sources of the at least one data set, wherein the data sources are within the database.

3. The method of claim 1, wherein determining that the first user account is authorized to access the at least one data set presented by the worksheet comprises:
    determining that the first user account is not authorized to access data sources of the at least one data set; and
    determining that the second user account is authorized to grant access to the data sources of the at least one data set.

4. The method of claim 1, further comprising denying the first user account access to the worksheet in response to determining that the first user account is authorized to access the worksheet architecture of the worksheet and determining that the first user account is not authorized to access the at least one data set presented by the worksheet.

5. The method of claim 1, wherein the at least one data set comprises a first data set from a first data source on the database and a second data set from a second data source on the database, and wherein determining that the first user account is authorized to access the at least one data set presented by the worksheet comprises determining that the first user account is authorized to access the first data source and the second data source on the database.

6. The method of claim 1, wherein determining that the first user account is authorized to access the at least one data set presented by the worksheet comprises determining that the first user account is not authorized to access portions of a data source of the data set that are not within the data set presented in the worksheet.

7. The method of claim 1, wherein granting the first user account access to the worksheet comprises presenting, to a user of the first user account, the at least one data set from the database within the worksheet comprising the worksheet architecture for the at least one data set from the database.

8. An apparatus for managing worksheet access, the apparatus comprising a computer processor, a computer memory operatively coupled to the computer processor, the computer memory having disposed within it computer program instructions that, when executed by the computer processor, cause the apparatus to carry out the steps of:
    receiving a request from a first user account to access a worksheet shared from a second user account, wherein the worksheet comprises a worksheet architecture for at least one data set from a database;
    determining that the first user account is authorized to access the worksheet architecture of the worksheet;

determining that the first user account is authorized to access the at least one data set presented by the worksheet, including comparing an identifier of the first user account to identifiers of an authorized set of user accounts for each data source within the database and associated with the at least one data set; and granting the first user account access to the worksheet in response to determining that the first user account is authorized to access the worksheet architecture of the worksheet and determining that the first user account is authorized to access the at least one data set presented by the worksheet.

9. The apparatus of claim 8, wherein determining that the first user account is authorized to access the at least one data set presented by the worksheet comprises determining that the first user account is authorized to access data sources of the at least one data set, wherein the data sources are within the database.

10. The apparatus of claim 8, wherein determining that the first user account is authorized to access the at least one data set presented by the worksheet comprises:
  determining that the first user account is not authorized to access data sources of the at least one data set; and
  determining that the second user account is authorized to grant access to the data sources of the at least one data set.

11. The apparatus of claim 8, wherein the computer program instructions further cause the apparatus to carry out the step of denying the first user account access to the worksheet in response to determining that the first user account is authorized to access the worksheet architecture of the worksheet and determining that the first user account is not authorized to access the at least one data set presented by the worksheet.

12. The apparatus of claim 8, wherein the at least one data set comprises a first data set from a first data source on the database and a second data set from a second data source on the database, and wherein determining that the first user account is authorized to access the at least one data set presented by the worksheet comprises determining that the first user account is authorized to access the first data source and the second data source on the database.

13. The apparatus of claim 8, wherein determining that the first user account is authorized to access the at least one data set presented by the worksheet comprises determining that the first user account is not authorized to access portions of a data source of the data set that are not within the data set presented in the worksheet.

14. The apparatus of claim 8, wherein granting the first user account access to the worksheet comprises presenting, to a user of the first user account, the at least one data set from the database within the worksheet comprising the worksheet architecture for the at least one data set from the database.

15. A computer program product for managing worksheet access, the computer program product disposed upon a computer readable medium, the computer program product comprising computer program instructions that, when executed, cause a computer to carry out the steps of:
  receiving a request from a first user account to access a worksheet shared from a second user account, wherein the worksheet comprises a worksheet architecture for at least one data set from a database;
  determining that the first user account is authorized to access the worksheet architecture of the worksheet;
  determining that the first user account is authorized to access the at least one data set presented by the worksheet, including comparing an identifier of the first user account to identifiers of an authorized set of user accounts for each data source within the database and associated with the at least one data set; and
  granting the first user account access to the worksheet in response to determining that the first user account is authorized to access the worksheet architecture of the worksheet and determining that the first user account is authorized to access the at least one data set presented by the worksheet.

16. The computer program product of claim 15, wherein determining that the first user account is authorized to access the at least one data set presented by the worksheet comprises determining that the first user account is authorized to access data sources of the at least one data set, wherein the data sources are within the database.

17. The computer program product of claim 15, wherein determining that the first user account is authorized to access the at least one data set presented by the worksheet comprises:
  determining that the first user account is not authorized to access data sources of the at least one data set; and
  determining that the second user account is authorized to grant access to the data sources of the at least one data set.

18. The computer program product of claim 15, wherein the computer program instructions further cause the computer to carry out the step of denying the first user account access to the worksheet in response to determining that the first user account is authorized to access the worksheet architecture of the worksheet and determining that the first user account is not authorized to access the at least one data set presented by the worksheet.

19. The computer program product of claim 15, wherein the at least one data set comprises a first data set from a first data source on the database and a second data set from a second data source on the database, and wherein determining that the first user account is authorized to access the at least one data set presented by the worksheet comprises determining that the first user account is authorized to access the first data source and the second data source on the database.

20. The computer program product of claim 15, wherein determining that the first user account is authorized to access the at least one data set presented by the worksheet comprises determining that the first user account is not authorized to access portions of a data source of the data set that are not within the data set presented in the worksheet.

* * * * *